United States Patent
Giggenbach

[19]

[11] Patent Number: 6,104,478
[45] Date of Patent: Aug. 15, 2000

[54] SYSTEM FOR UNINTERRUPTED LIGHT BEAM DEFLECTION

[75] Inventor: Dirk Giggenbach, München, Germany

[73] Assignee: Deutsches Zentrum fur Luft-und Raumfahrt E.v., Bonn, Germany

[21] Appl. No.: 09/007,521

[22] Filed: Jan. 15, 1998

[30] Foreign Application Priority Data

Jan. 15, 1997 [DE] Germany .......................... 197 01 155

[51] Int. Cl.$^7$ .................................................. G01B 11/26
[52] U.S. Cl. ............................................ 356/140; 359/896
[58] Field of Search ..................... 359/196–236, 359/896, 641; 372/107, 95, 101; 219/121.7, 121.61; 385/31, 33; 356/399, 401, 138, 140, 150, 247

[56] References Cited

U.S. PATENT DOCUMENTS 3,805,015  4/1974  Herziger et al. .................. 359/896
4,144,505  3/1979  Angelbeck et al. ................ 356/141.3

FOREIGN PATENT DOCUMENTS 2848930  11/1978  Germany .
3716896   5/1987  Germany .

*Primary Examiner*—Frank G. Font
*Assistant Examiner*—Tu T. Nguyen
*Attorney, Agent, or Firm*—Browdy & Neimark

[57] ABSTRACT

A system for uninterrupted deflection of a light beam exiting from a radiation source can be offset via a laterally movable lever mechanism. A preferred radiation source is an optical guide in the form of an optical fiber (1), through which a laser light is emitted at a free end (10). The end of the lever or linkage mechanism facing away from the free end of the optical guide is connected to a controllable tilt mechanism including a piezo tilt table (8), a hinge (6), and a pivot (5). The tilt table motion is amplified at the free end radiation source (10) to rapidly change the beam angle (α).

10 Claims, 3 Drawing Sheets

SYSTEM FOR UNINTERRUPTED LIGHT BEAM DEFLECTION

FIELD OF THE INVENTION

The invention relates to a system for uninterrupted deflection of a light beam.

REVIEW OF THE RELATED TECHNOLOGY

A system for uninterrupted deflection of a light beam is known from DE 37 16 896 A1.

In optical free-beam transmission systems as they will be used in the future, for example in inter-satellite communication, stringent demands are placed on the pointing accuracy of the telescopes used as "antennas."

However, a problem exists in directing a coherent laser beam at the partner terminal while compensating for the vibrations on a satellite platform, (or, in the case of a terrestrial transmission, for the beam offset caused by the atmospheric refraction index fluctuations). Conversely, the problem of aligning the receiver telescope with the transmitter must be solved as well.

According to an ESA-model, on a communication satellite the angular density spectrum (S(f)) of the Gaussian-distributed angularity errors of an axis, which need to be compensated for—the so-called mechanical noise—behaves according to the following formula:

$$S(f) = k(160)/(1 + f^2); k = \frac{\mu rad^2}{Hz} \quad (1)$$

where f denotes frequency (in hertz, Hz). The constant k has units to give S units of microrad² over frequency in Hz. (M. Wittig et al, "In-Orbit Measurements of Microaccelerations of ESA's Communication Satellite OLYMPUS" SPIE Vol. 1218 Free-Space Laser Communication Technologies II (1990), p.205–214).

From this it follows that the desirable control bandwidth for a beam correction system lies between zero and several hundred hertz. Above one hertz the noise power density decreases by 20 dB per decade. For example, it is known that in a 25 mm telescope aperture the proportions of the noise angular density above 160 hertz result in a standard residual error deviation of approximately one-twentieth of the beam divergence angle if a PI-type controller is used. This residual error is considered acceptable during an existing communication link.

Slower correction movements with a larger amplitude (in the range of several millirad) are required in addition, to compensate for an offset coarse pointing and relative movement of the two satellites. The coarse pointing to cover the entire line of sight, in turn, is carried out by higher-order mechanics, for example in the form of a periscope or gimbal.

The beam correction movements are required, symmetrically, both in the transmitter and receiver, since the requirements that apply to the alignment of the receiver optics are based on a similar principle as those that apply to the target accuracy of the transmitter.

Until now various systems have been used—some of them purely mechanical, some of them based on electro-magnetic effects. For example, a plurality of piezoelectric crystals are used to tilt, upon their linear deformation, a platform on which one tilting mirror is mounted. While high positioning forces and fast deflections can be attained with a system of this type, the attainable tilting angles are limited to a few millirad. Tilting angles of several degrees can be attained with the aid of mirrors moved via electrical coils—the so-called coil tilting mirrors—with the actual attainable angles depending on the design of the coil tilting mirrors.

As it is virtually impossible to exceed limiting frequencies of a few hertz, the above gimbal mechanisms or periscopes are only suitable for the slow coarse pointing of the telescope; furthermore the absolute positioning accuracy attainable with this mechanical device is too low.

Since the refraction index of certain crystals changes when high; frequency oscillations are applied to the material, this acousto-optical effect can be used to deflect a beam arriving at an angle.

The refraction index of certain crystals can furthermore be influenced for a polarization direction of the light passing through same by applying an electrical voltage, which means this electro-optical effect can be utilized as well.

A so-called electrostatic fiber nutator is furthermore known, in which a metallic-coated fiber end is suspended in an adjustable electrical field.

When an electric voltage is applied, piezoelectric crystals in the shape of small tubes—the so-called piezo tubes—are furthermore deformed, with the result that a fiber end can be deflected.

A further method known from laser printers, in which polygon mirrors are used, is also unsuitable to solve the above-described problem since the polygon mirrors turn and therefore interrupt the laser beam several times per rotation. Interruptions of this kind are undesired in communication links, for obvious reasons.

With respect to the above-described problems, difficulties furthermore arise from the fact that a relatively large angular range must be attained along with the high positioning speed. When a beam is deflected via a mirror, the possibilities for correcting the angle are limited to twice the mirror deflection angle. For this purpose, a tilting mirror must be operatively disposed in a diverging optical path, as schematically indicated in FIG. 2, in close proximity to a lens, for example a collimator lens since, at an unchanged mirror tilt-angle, the effective correction angle decreases with an increasing distance of the lens from the tilting mirror.

Since the beam coming from a focusing point schematically indicated in FIG. 3 already has a large diameter when it impinges upon the mirror, the mirror must necessarily be designed accordingly large and heavy, which in turn significantly decreases the resonance frequency, and hence the speed of the control loop. Furthermore, the lens provided downstream from the tilting mirror presents an obstacle to the continued path of the beam, so that the mirror must be arranged at a certain angle to the lens. This, in turn, results in additional aberrations and furthermore leads to an ellipsoid widening of the beam, yet again requiring a larger mirror and, hence, a mirror with a greater weight.

When a so-called piezo tilting table is used, for example, the maximum deflection amplitude of the tilting table is limited, because of the small expansion coefficient of the piezoelectric crystals. (At a maximum voltage (150 V), the expansion corresponds to 0.13% of the length of the crystals.) If larger angles are required, accordingly larger piezoelectric crystal rods must be used. These, in turn, then have a stiffness which decreases proportionally to their length, and they also have a greater mass, both of which are factors that cause a decreased resonance frequency. Also, the resulting dimensions of the system are unacceptable.

Tilting mirrors operated with coils, the so-called coil tilting mirrors, permit large angles of up to several degrees. The forces attainable with the use of coils are significantly lower than those attainable with piezoelectric crystals which, again, means the system will have a decreased bandwidth or a higher power consumption. In order to keep the deflection angles static, the coils must be carrying current at all times which, because of the finite coil resistance, results in a relatively high energy consumption.

In summary, the prior art thus has the following drawbacks:

The designs that have become known until now are either too slow or they generate interfering self-resonances, particularly because of their use of large mirrors. In other known designs the dynamic range is too small because of the use of small mirrors, the use of piezo tubes, or because of the electro-optical effect. Furthermore, some designs have a lower limiting frequency, so that a static pointing offset cannot be corrected, for example, if an electrostatic fiber nutator is used. The signal frequency is affected by the acousto-optical effect, with the result that a coherent signal, as it is required for a heterodyne reception, is distorted.

Furthermore, the above-described methods in which, for example, an electro-optical effect occurs, result in significant optical losses. Also, in many of the cases, large and heavy components are required, so that the weight of these designs alone makes them essentially unsuitable for space applications. In addition to their oftentimes high energy consumption, many of these systems also have a highly complex technical design, or the implemented technical solutions are too sensitive for a reliable application in satellites. Another drawback in using tilt-mirrors is that the mirror-body itself experiences mechanical resonances at high tilting frequencies which lead to distortions of the mirror surface and thus cause optical aberrations of the reflected light wave.

Generally, when beam deflection systems are to be evaluated, one must, as a rule, ensure that a first, clear amplitude resonance is given as the resonance frequency. However, in studies performed by the applicant, it has been shown that many of these beam deflection systems already show a phase lag of over 180° at considerably lower frequencies, at approximately one fifth of the amplitude resonance frequency. This, however, significantly reduces the attainable control bandwidth. For this reason, the main focus in a consistent evaluation of beam control mechanisms must be on the phase response.

SUMMARY OF THE INVENTION

It is therefore an object of the invention to create a system for an uninterrupted deflection of a beam that has a large dynamic range and a high resonance frequency range.

In a system for an uninterrupted deflection of a beam according to the invention, this object is met with a controllable tilt mechanism connected on the side of the system facing away from the free end of the light guide.

As opposed to the above-described systems that have been known to date, the system according to the invention advantageously has particularly small dimensions, few components, robust mechanics and, consequently, a low overall weight. These are advantages which are of great significance, specifically for space applications.

Furthermore, the system according to the invention requires no additional optical surfaces. The optical surfaces of the known designs have caused problems with losses and directional control of a portion of the impinging light; furthermore the portion of the light which is scattered can have significant effects on the receiver unit in a transceiver with combined transmitter and receiver optics. In the present invention these problems have thus been eliminated.

An advantageous improvement of the present invention is the use of an optical fiber to guide the light, which permits the use of a great number of available fiber-coupled lasers and detectors. When used in a coherent receiver, heterodyning of the received light with the local oscillator light by means of an optical fiber-cross-coupler becomes possible very easily. Furthermore, the system according to the invention has large static deflection angles. Since, furthermore, only standard mechanical components are used, the present system for an uninterrupted deflection of a beam represents a markedly cost-effective means for attaining the object of the invention.

BRIEF DESCRIPTION OF THE DRAWING

The invention is described below, based on preferred embodiments, with reference to the appended drawings. The figures show as follows.

DETAILED DESCRIPTION OF THE PREFERRED EMBODIMENTS

Figure 1:
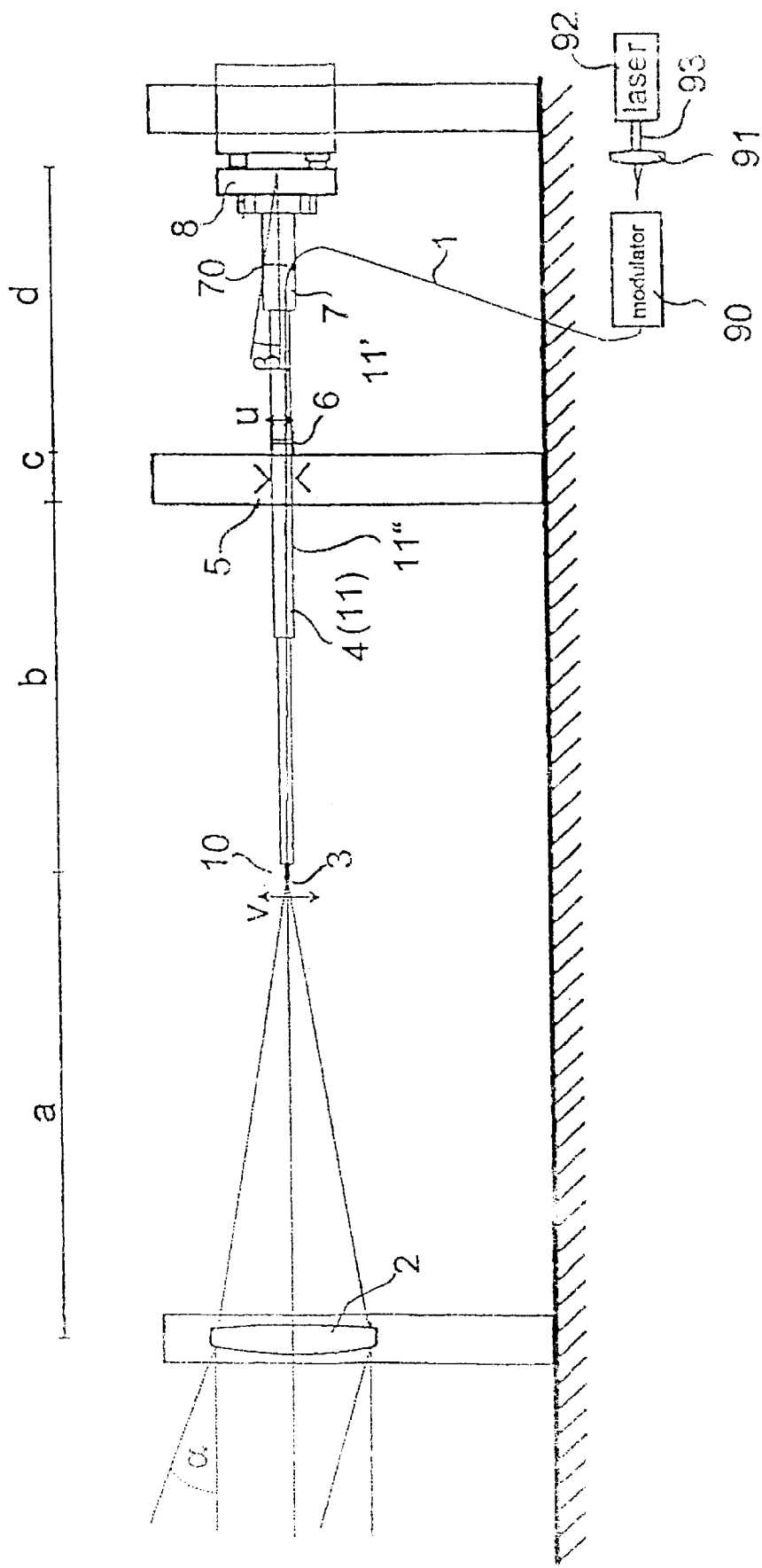
FIG. 1 is a schematic-elevational view of a first embodiment of a system for an uninterrupted deflection of a beam according to the present invention.

In FIG. 1, a first embodiment of the system according to the invention for an uninterrupted deflection of a beam has a lens 2, preferably in the form of a collimator lens with a focal distance a along an optical axis of the lens: 2. At the focusing (focal) point 3 of the lens 2, a free end 10 of an optical guide 1 is indicated schematically in the form of an optical fiber. The light exiting from the optical fiber end diverges, according to elementary optical correlations (i.e., by diffraction), at an angle which can be accurately determined; diameter and focal distance of the lens 2 have been selected so that the lens is exactly illuminated. The portion of the optical guide 1 located adjacent to the free end 10 is held in place with a holder element 4, for example in the form of a tube 11 inside a hinge-like suspension mechanism 5 symbolized in the drawing by triangles or arrows inside the central pedestal but nor shown in detail. The tube 11 narrows toward the end of the optical fiber.

An element 6 acts as a joint between element 4 and holder element 7 (discussed below) which may be embodied with two portions 11' and 11" of tubing with the joint 6 between these portions. The joint 6 is to the left of the hinge-like suspension device 5 marked by arrows, through which the optical guide 1 in the form of the optical fiber is threaded. Beyond the joint element 6, the optical guide 1 is housed inside a second holder element 7 which may be embodied in the form of another tube. At a location 70 the optical guide 1, in the form of the optical fiber, extends from the tube-shaped holder element 7 and is connected, via a data signal modulator 90, to a lens 91 illustrated schematically and shown significantly enlarged in the drawing. The lens 91 has an assigned transmitter laser 92, from which light signals are emitted to the lens 91, in the direction indicated by the arrows 93.

The lens 91 and the transmitter laser 92 can also be replaced by a known fiber coupled transmitter laser (standard telecom product).

Figure 2:
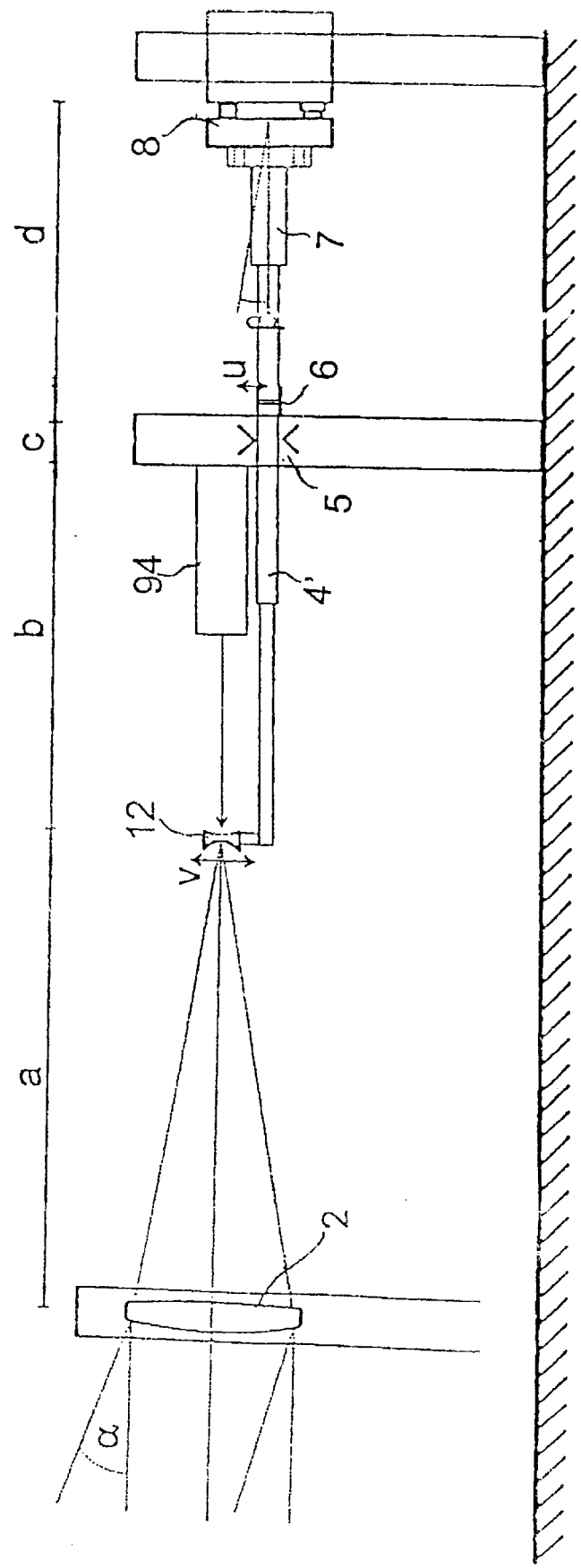
FIG. 2 is a schematic-elevational view of a second embodiment of a system for an uninterrupted deflection of a beam according to the present invention.
Figure 3:
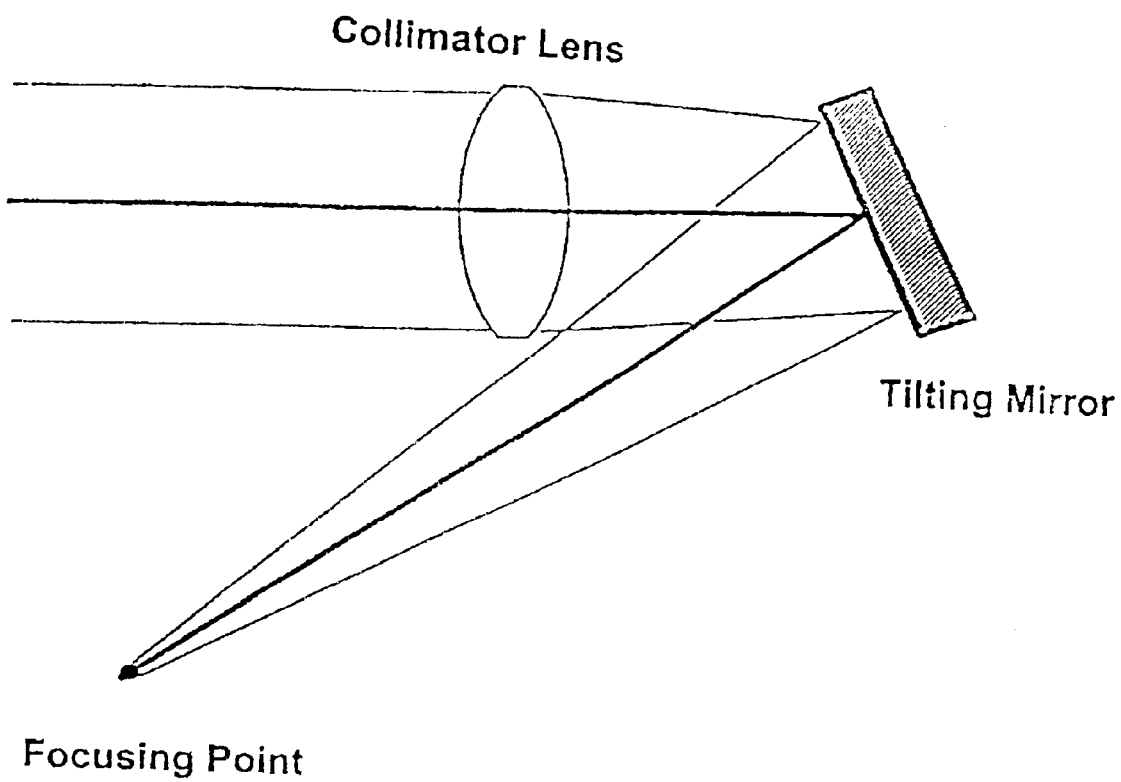
FIG. 3 is a schematic-perspective view of the principle of a known system for deflecting a beam by means of a tilt mirro

A second embodiment of the system according to the invention for an uninterrupted deflection of a beam will described with respect to FIG. 2. It is to be noted that the structural elements used in the first and second embodiments are designated with the same reference numerals; a description thereof is omitted in relation to FIG. 2.

In FIG. 2 the data signal modulator 90, the lens 91 and the transmitter 92 are replaced by a unit 94 having a laser light source and a data signal modulator. An additional lens 12, preferably in form of a beam-expander lens, is provided at the end of a third holder element 4' approximately in the focusing point 3 of the collimator lens 2, in lieu of the end of the optical guide in FIG. 1.

The right end of the second holder element 7 shown in FIGS. 1 and 2 is attached to a tilting table 8, also shown only schematically in the drawing, which can be tilted via a suitable mechanism. The tilting is preferably aaccomplished via the above-described piezo tilting table. However, a mechanism with coils or with other fast responding, correspondingly powerful actuators may also be used to accomplish the tilting.

FIG. 1 shows a lateral offset of the radiation source formed by the free end 10 of the optical guide 1 and denoted by the letter v in the illustrated embodiment.

As shown in FIG. 2, a free collimated beam coming from the unit 94 and exiting through the additional lens 12 is then expanded by this lens in correlation to the selected focal distance, for example also with the same divergence angle as the light exiting from the optical fiber end 10; the beam expanded by the additional lens 12 then illuminates the transmitting lens 2. A lateral movement of the additional lens 12 (via the lever mechanism formed by the holder elements 4' and 7) then also results in an angular offset of the expanding beam.

A reflecting angle α on the left side of the lens 2 in FIGS. 1 or 2 with a focal distance a then changes by α=arctan(v/a). With the applications considered here, the greatest occurring angles are generally less than one degree (1°) which corresponds to 17 mrad. With the approximation x=arctan(x) for the small angles considered here, which are usually less than one degree (1°), the reflecting angle α is approximately proportional to the lateral offset v.

As described above, the source of the beam is preferably the end 10 of an optical guide 1 (FIG. 1) embodied as an optical fiber, since optical guides of this type are very thin (approximately 0.25 mm) and light-weight and can thus be moved very fast.

As shown in FIGS. 1 and 2, above the schematic illustration, the distance from the free end 10 of the optical guide 1 and the additional lens 12 respectively to the hinge-like suspension device 5 symbolized by triangles is denoted by the letter b, while the distance from the hinge-like suspension device 5 to the schematically illustrated joint 6 is denoted by the letter c. Lastly, the distance from the joint 6 to the end of the tilting table 8 is denoted by d.

Because of the lever between the joint 6 and the hinge-like suspension device 5, a tilting of the first holder element 4 (FIG. 1), or of the third holder element 4' (FIG. 2) which may be embodied, for example, as a tube is accordingly intensified. In the derivation shown below, the tilting angles attainable at the tilting table 8 are denoted by β and the offset attainable at the joint 6 is denoted by u.

A tilting of the tilting table 8 has the following effect on the reflecting angle a of the beam coming from tens 2:

$$\tan(\beta) = \frac{u}{d}; v = \frac{u \cdot b}{c}; \quad (2)$$

$$\tan(\alpha) = \frac{v}{a} \Rightarrow \text{transformation ratio: } \frac{\tan(\alpha)}{\tan(\beta)} = \frac{d \cdot b}{a \cdot c}$$

For small angles, the tangent can be approximated through its argument in rad:

$$\frac{\alpha}{\beta} = \frac{d \cdot b}{a \cdot c} \quad (3)$$

The tilting generated by the lever movement can be performed in both angle directions, i.e., parallel and perpendicular to the sectional plane of FIG. 1, The greatest possible deflection can be set, for example, with the use of the same piezo tilting table by adjusting the aspect ratio, specifically by shortening the distance c between the suspension device 5 and the joint 6. The parameter a is normally determined by the required dimensions of the lens 2 and by the divergence of the beam from the optical guide 1.

To prevent an unfavorable distribution of the moments of inertia, which would have a negative impact on the phase shift, the distance d and particularly the distance b should not be selected too large. In principle there are no limits to the adjustable lever ratio. It should be noted, however, that a stable mechanism that is free from play must be used for the hinge-like suspension device 5 and the joint 6.

To save weight and thus attain a higher resonance frequency, the additional lens provided at the left end of the holder element 4 should be made small; which means that a narrow, collimated laser beam can be used. Furthermore, different lever ratios may be set by fine-tuning the focal distance of the lens provided at the left end of the holder element and that of the actual transmitter lens 2. Suitable mechanisms are known from optics, for example from the design and dimensioning of telescopes. A system modified in this manner from the design in FIG. 1 is of interest, for example, for applications in which no fiber beams are used, or in which they should be avoided, and where free-beam optics are used instead.

FIG. 1 shows a functional laboratory prototype by the applicant which is used by the applicant as a transmitter beam controller in an optical free-beam experiment. In this design, the hinge-like suspension mechanism 5 symbolized by the two triangles consists of a rubber band and the joint 6 is formed by a short shrinkdown plastic tubing.

Although, because of their elasticity, the elements used in the laboratory prototype reduce the resonance frequency and cause lateral divergence movements, satisfactory results have nevertheless been attained with this laboratory prototype. It may be assumed that the resonance frequency can be increased considerably with the use of different types of joint mechanisms. The piezo tilting table used as the actuator in the laboratory prototype has a maximum tilt angle of 2 mrad per axis at an applied voltage of 150 V.

The piezo technology was preferred in the laboratory prototype over coils, for example, because it permits particularly small dimensions and does not consume any power during a static deflection. With the laboratory prototype, a lever transmission of 1:5 was attained and thus a deflection of 10 mrad.

In dependence on optical system parameters, such as convergence angles and the quality of the lens, image defects, such as aberrations due to a decentration, occur at larger deflection amplitudes which, in the case of a transmitter, for example, causes an expansion of the beam in the distant field with the telescope designs commonly used in free-space communication, with angles in the range of several millirad, these aberrations are not critical, however, and depending on the actual application, aberrations up to angles of several degrees may be neglected.

By reversing the beam path, the above principle can also be used in a receiver. In this case the light impinging on a lens 2 in FIG. 1 would be coupled into the optical guide or optical fiber end, respectively. This possibility is of particular interest, specifically for an optical heterodyne reception, since the received light can be easily mixed with light from a local oscillator in a fiber cross coupler.

It is also possible to use only a fraction of the dynamic range gained with the system, with the result that the high voltages for the piezoelectric elements can be reduced. The same deflection amplitudes that have been attained with the above piezo tilting mirrors can now be achieved with the lower voltages which are customary on satellites, instead of a voltage of 150 V (which is usually required for low-voltage piezo elements).

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means and materials for carrying out various disclosed functions may take a variety of alternative forms without departing from the invention.

Thus the expression "means to . . . " and "means for . . . " as may be found in the specification above and/or in the claims below, followed by a functional statement, are intended to define and cover whatever structural, physical, chemical or electrical element or structure may now or in the future exist carries out the recited function, whether or not precisely equivalent to the embodiment or embodiments disclosed in the specification above; and it is intended that such expressions be given their broadest interpretation.

What is claimed is:

1. A system for uninterrupted deflection of a light beam, comprising:
   at least one collimator lens (2);
   a radiation source (1) from which the light beam exits toward the lens;
   a laterally movable radiation source-offsetting mechanism (4-7), the mechanism further comprising a first end connected to a controllable tilt device (8) and a second, free end facing away from the first end and toward the lens, the radiation source being located at the free end.

2. The system according to claim 1, wherein the light beam includes laser light and wherein the radiation source comprises an optical guide (1) including an optical fiber, through which the laser light is emitted.

3. The system according to claim 1, wherein the radiation source comprises a parallel free-beam and the source-offsetting mechanism (4'-7) includes a beam-expander lens (12) mounted at the free end.

4. The system according to claim 1, wherein the source-offsetting mechanism (4-7; 4'-7) has a transformation ratio of $$\frac{\tan(\alpha)}{\tan(\beta)} = \frac{d \cdot b}{a \cdot c}$$

where
   $\alpha$ denotes an exit angle from the collimator lens (2),
   $\beta$ denotes a tilt angle of the tilt device (8),
   a denotes a focal distance of the lens,
   b denotes a first distance between the free end and a suspension mechanism (5),
   c denotes a second distance between the suspension mechanism and a joint (6), and
   d denotes the distance between the joint (6) and the tilt device (8).

5. The system according to claim 1, wherein the light beam diverges from the radiation source toward the collimator lens, whereby the collimator lens is illuminated.

6. The system according to claim 2, wherein the light beam diverges from the radiation source toward the collimator lens by diffraction.

7. The system according to claim 5, wherein the light source is located at the focal point of the collimator lens, whereby the light beam is collimated on a side of the collimator lens opposite to the light source.

8. A system for rapidly steering a collimated optical beam, comprising:
   a collimator lens (2) having an optical axis;
   a light-weight radiation source (10) located approximately on the optical axis of the lens,
   an actuator device; and
   a mechanical linkage between the actuator device and the radiation source;
   whereby the radiation source is moved across the optical-axis to steer the beam from the collimator lens.

9. The system according to claim 8, wherein the light beam diverges from the radiation source toward the collimator lens, whereby the collimator lens is illuminated.

10. The system according to claim 9, wherein the light source is located at the focal point of the collimator lens, whereby the light beam is collimated on a side of the collimator lens opposite to the light source.

* * * * *